(12) United States Patent  
Zirbes

(10) Patent No.: US 6,696,952 B2
(45) Date of Patent: Feb. 24, 2004

(54) STRUCTURES AND ASSEMBLY METHODS FOR RADIO-FREQUENCY-IDENTIFICATION MODULES

(75) Inventor: Glen Zirbes, Silver Lake, MN (US)

(73) Assignee: HEI, Inc., Victoria, MN (US)

( * ) Notice: Subject to any disclaimer, the term of this patent is extended or adjusted under 35 U.S.C. 154(b) by 87 days.

(21) Appl. No.: 09/922,245

(22) Filed: Aug. 3, 2001

(65) Prior Publication Data

US 2002/0044057 A1 Apr. 18, 2002

Related U.S. Application Data

(60) Provisional application No. 60/223,071, filed on Aug. 4, 2000.

(51) Int. Cl.⁷ .............................................. G08B 13/14
(52) U.S. Cl. ................... 340/572.1; 257/666; 361/813; 340/572.7
(58) Field of Search ................ 340/572.1, 572.7; 361/813; 257/666

(56) References Cited

U.S. PATENT DOCUMENTS

| | | | | |
|---|---|---|---|---|
| 4,356,529 A | | 10/1982 | Kopel | 361/304 |
| 5,325,268 A | * | 6/1994 | Nachnani et al. | 257/666 X |
| 5,420,757 A | | 5/1995 | Eberhardt et al. | 361/813 |
| 5,682,143 A | * | 10/1997 | Brady et al. | 340/572.1 |
| 5,708,419 A | | 1/1998 | Isaacson et al. | 340/572 |
| 5,786,626 A | | 7/1998 | Brady et al. | 257/673 |
| 6,031,459 A | | 2/2000 | Lake | 340/572.8 |
| 6,036,099 A | | 3/2000 | Leighton | 235/488 |
| 6,043,746 A | | 3/2000 | Sorrells | 340/572.7 |
| 6,072,383 A | | 6/2000 | Gallagher, III et al. | 340/10.2 |
| 6,091,332 A | * | 7/2000 | Eberhardt et al. | 340/572.1 |
| 6,147,655 A | | 11/2000 | Roesner | 343/741 |
| 6,249,227 B1 | * | 6/2001 | Brady et al. | 340/572.1 |
| 6,268,796 B1 | | 7/2001 | Gnadinger et al. | 340/572.5 |
| 6,275,158 B1 | * | 8/2001 | Toth et al. | 340/572.8 |
| 6,321,994 B1 | * | 11/2001 | Toth et al. | 235/492 |

FOREIGN PATENT DOCUMENTS

| | | |
|---|---|---|
| JP | 342582 | 10/1998 |
| JP | 343323 | 10/1998 |
| WO | WO-97/12263 | 4/1997 |
| WO | WO-00/36557 | 6/2000 |
| WO | WO-00/38110 | 6/2000 |

* cited by examiner

*Primary Examiner*—Thomas Mullen
(74) *Attorney, Agent, or Firm*—Schwegman, Lundberg, Woessner & Kluth, P.A.

(57) ABSTRACT

Radio-frequency identification (RFID) devices are used in a variety of applications to facilitate the identification and tracking of people, objects, and animals. One problem with RFID devices or tags concerns manufacturing cost. Specifically, some tag designs use an integrated-circuit chip requiring three external connections, instead of two as do many other designs. Accordingly, the present inventor devised a unique RFID module which uses a three-terminal integrated circuit and two capacitors, but only requires two external leads. One exemplary embodiment of the module includes two external terminals for connection to an antenna coil and an internal terminal for connection to a center-tap of a dual (center-tapped) capacitor. Other aspects of the invention include subcomponents of the module and methods of tag assembly using the module.

14 Claims, 3 Drawing Sheets

STRUCTURES AND ASSEMBLY METHODS FOR RADIO-FREQUENCY-IDENTIFICATION MODULES

RELATED APPLICATION

This application is a continuation of U.S. Provisional Application No. 60/223,071, which was filed on Aug. 4, 2000. This application is incorporated herein by reference.

TECHNICAL FIELD

The present invention concerns radio-frequency identification devices, particularly related assembly methods and structures for modules in such devices.

BACKGROUND

Radio-frequency identification (RFID) devices are used in a variety of applications to facilitate the identification and tracking of people, objects, and animals. Each device, also known as a tag or smart card, can be attached to a person, object, or animal. The devices typically include an antenna coil, radio circuitry, and a memory, enabling them not only to receive radio-frequency signals from a reader or interrogation device, but also to send back signals representing the data in their memories. The data, generally a unique identification number, can then be used with a computerized database to associate the tagged person, object, or animal with other data, such as price, shipping, inventory, or owner information.

One problem with RFID devices or tags concerns manufacturing cost. In particular, the inventor recognized that some tag designs use a module requiring three external connections, instead of two as do many other designs. For example, one such design uses a module that has three external terminals A, B, and C, and requires connection of an antenna coil between terminals A and C and connection of one external capacitor between terminals A and B and another external capacitor between terminals B and C. Although the two capacitors in the design provide an increased communication range, the additional complexity of connecting to the extra terminal restricted commercial application for the design.

Accordingly, the inventor identified a need for a better way of manufacturing tags that require three external terminals and two capacitors.

SUMMARY

To address these and other needs, the present inventor devised a unique radio-frequency-identification (RFID) module which uses two capacitors, but only requires two external connections. In one exemplary embodiment, the module includes two external terminals for connection to an antenna coil and an internal terminal for connection to a tap of a dual (center-tapped) capacitor. Other aspects of the invention include components of the module and methods of assembling tags using the module.

DETAILED DESCRIPTION OF EXEMPLARY EMBODIMENTS

The following detailed description, which references and incorporates the above-identified figures, describes and illustrates one or more specific embodiments of the invention. These embodiments, offered not to limit but only to exemplify and teach, are shown and described in sufficient detail to enable those skilled in the art to implement or practice the invention. Thus, where appropriate to avoid obscuring the invention, the description may omit certain information known to those of skill in the art.

Figure 1:
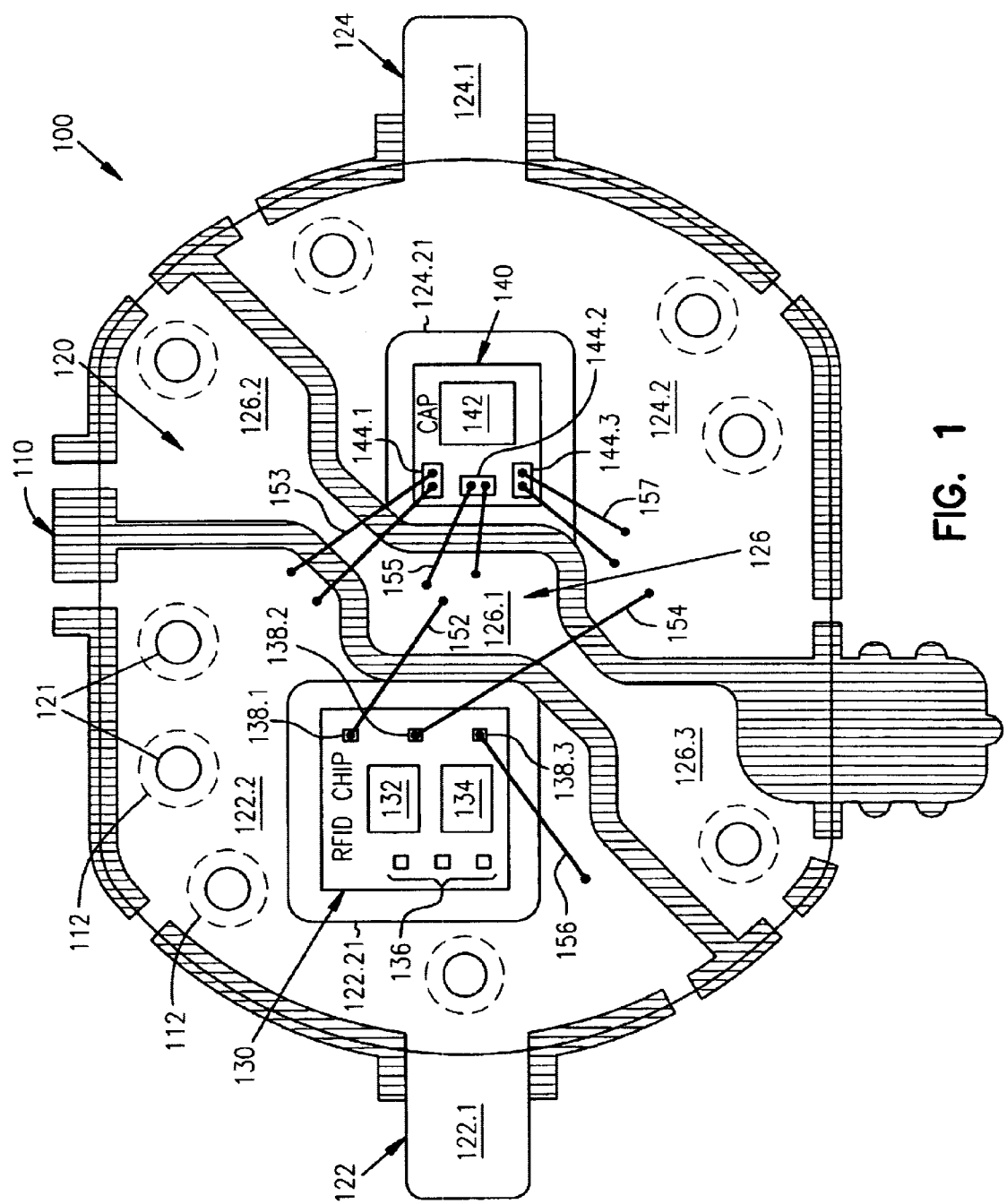
FIG. 1 is a plan view of an exemplary RFID module 100 incorporating teachings of the present invention.

FIG. 1 shows an exemplary two-terminal RFID module 100 incorporating teachings of the present invention. Module 100 includes insulative structure 110, lead frame 120, integrated-circuit chips (or dies) 130 and 140, and conductor set 150.

Insulative structure 110 includes a number of rivet-like posts 112, which project through holes or openings 121 in lead frame 120, securing the relative position and electrical isolation of various portions of lead frame 120. In the exemplary embodiment, insulative structure 110, which is generally rectangular, is formed of an insulative mold material, such as a semiconductor transfer-molding compound. One commercially available compound is MG46F-AM compound from Dexter Hysol.

In addition to openings 121, lead frame 120 includes contact structures 122 and 124 and an intermediate contact structure 126. Contact structure 122 includes an extended portion 122.1 and a body portion 122.2. Extended portion 122.1, which has an exemplary thickness of 0.006 inches, extends beyond insulative structure 110 by about 0.057 inches. Body portion 122.2 includes a rectangular recessed region 122.21. Recessed region 122.21, which has an exemplary thickness that is 50–80% of the thickness of the remainder of the body portion, is formed, for example, by etching or stamping.

Similarly, contact structure 124 which lies opposite contact structure 122, includes an extended portion 124.1 and a body portion 124.2. Extended portion 124.1, which has an exemplary thickness of 0.006 inches, extends beyond insulative structure 110 by about 0.057 inches. Body portion 124.2 includes a rectangular recessed region 124.21. Recessed region 124.21 has a thickness in the range of 50–80% of its surrounding regions.

Inclusion of the recessed regions in body portions 122.2 and 124.2 reduces the overall height of module 100. However, other embodiments can reduce module height by removing all or part of material within the recessed regions, defining holes or slots.

Lying between contact structures 122 and 124 is intermediate contact structure 126. Intermediate contact structure 126 includes a central portion 126.1 and end portions 126.2 and 126.3. Central portion 126.1 is not only centered between end portions 126.2 and 126.3, but also approximately centered within lead frame 120.

The exemplary embodiment forms lead frame 120 from conductive material, such as OLIN 194 copper using conventional techniques, and then silver-plates the lead frame to enhance its electrical conductivity. Other embodiments, however, plate the lead frame with other conductive materials, such as gold, or omit plating altogether. Some embodiments spot-plate highly-conductive runs on the contact structures to reduce the amount of plated material, whereas others form the entire lead frame from gold or silver. Still other embodiments for the conductive structure through deposition of material on 2 substrates. The invention is not limited to any particular material composition or method of forming lead frames.

In addition to insulative structure 110 and lead frame 120, RFID module 100 includes application-specific integrated-circuit (ASIC) chips 130 and 140, and conductor set 150. Integrated-circuit chip (or module) 130, which is attached to rectangular recess region 122.21 using a conventional chip-on-board technique, includes wireless-communications circuitry 132 and a memory circuit 134 to implement a passive RFID read-only tagging function. In the exemplary embodiment, the memory circuit is pre-programmed with data, such as a unique identification number; however, in other embodiments, for example, those that use read-write tagging circuitry, it need not be pre-programmed. Chip 130 also includes three external test terminals 136 for testing the RFID circuitry, and three external-connection terminals (or contact pads) 138.1, 138.2, and 138.3 for connection to external components, such as integrated-circuit chip 140.

Although the invention is not limited to any particular form of integrated-circuit chip 130, the exemplary embodiments uses the 13.56 MHz MCRF355 RFID chip from Microchip Technology, Incorporated of Chandler, Ariz. In this case, external-connection terminals 138.1, 138.2, and 138.3 correspond respectively to terminals A, B, and Vss.

Integrated-circuit module 140, which is attached to rectangular recess region 124.21 using a conventional chip-on-board or epoxy-globbing technique, includes an integrated dual or center-tapped capacitor 142 and has external-connection terminals (or contact pads) 144.1–144.3. Capacitor 142 includes a pair of end contacts and a center tap (not shown) which are coupled to terminals 144.1–144.3.

In the exemplary embodiment, each half of center-tapped capacitor 142 has a nominal capacitance of 68 picofarads, with a tolerance of ±3%. However, in other embodiments, the capacitor is not center tapped, meaning that each "half" has a different nominal capacitance. Some other embodiments use two distinct capacitors, with each having one of its terminals (or nodes) connected to a common one of the external-connection terminals. Other embodiments may provide two pairs of external-connection terminals, with one pair coupled to one capacitor and the other pair coupled to the other capacitor.

Conductor set 150 includes wire-bond connections 152, 154, and 156 and double-wire-bond connections 153, 155, and 157, which electrically connect integrated-circuit chips 130 and 140 to each other through lead frame 120.

Specifically, wire-bond connection 152 electrically connects intermediate contact structure 126 to terminal 138.1; wire-bond connection 154 electrically connects contact structure 124 to terminal 138.2; and wire-bond connection 156 connects contact structure 122 to terminal 138.3. Double-wire-bond connection 153 connects terminal 144.1 to contact structure 122; double-wire-bond connection 155 connects terminal 144.2 to intermediate contact structure 126; and double-wire-bond connection 157 connects terminal 144.3 to contact structure 124.

The exemplary embodiment forms these connections using a conventional gold-ball bonder. However, other embodiments use an aluminum-edge bonder. Additionally, the exemplary embodiment uses double-wire bonding for connections 153, 155, and 157 to facilitate automatic testing of the connections. Double-wire bonding can also be used for connections 152, 154, and 156. The invention is not limited to any particular connection structure or technique.

These connections not only couple each of the three terminals of center-tapped capacitor 142 in chip 140 to one of the three external-connection terminals of chip 130, but also couple chip 140 to contact structures 122 and 124. As FIG. 2 shows, this exemplary embodiment enables one to install a three-terminal RFID chip, such as the MCRF355 RFID chip from Microchip Technology, Incorporated, in a conventional antenna substrate assembly using only two connections.

Figure 2:
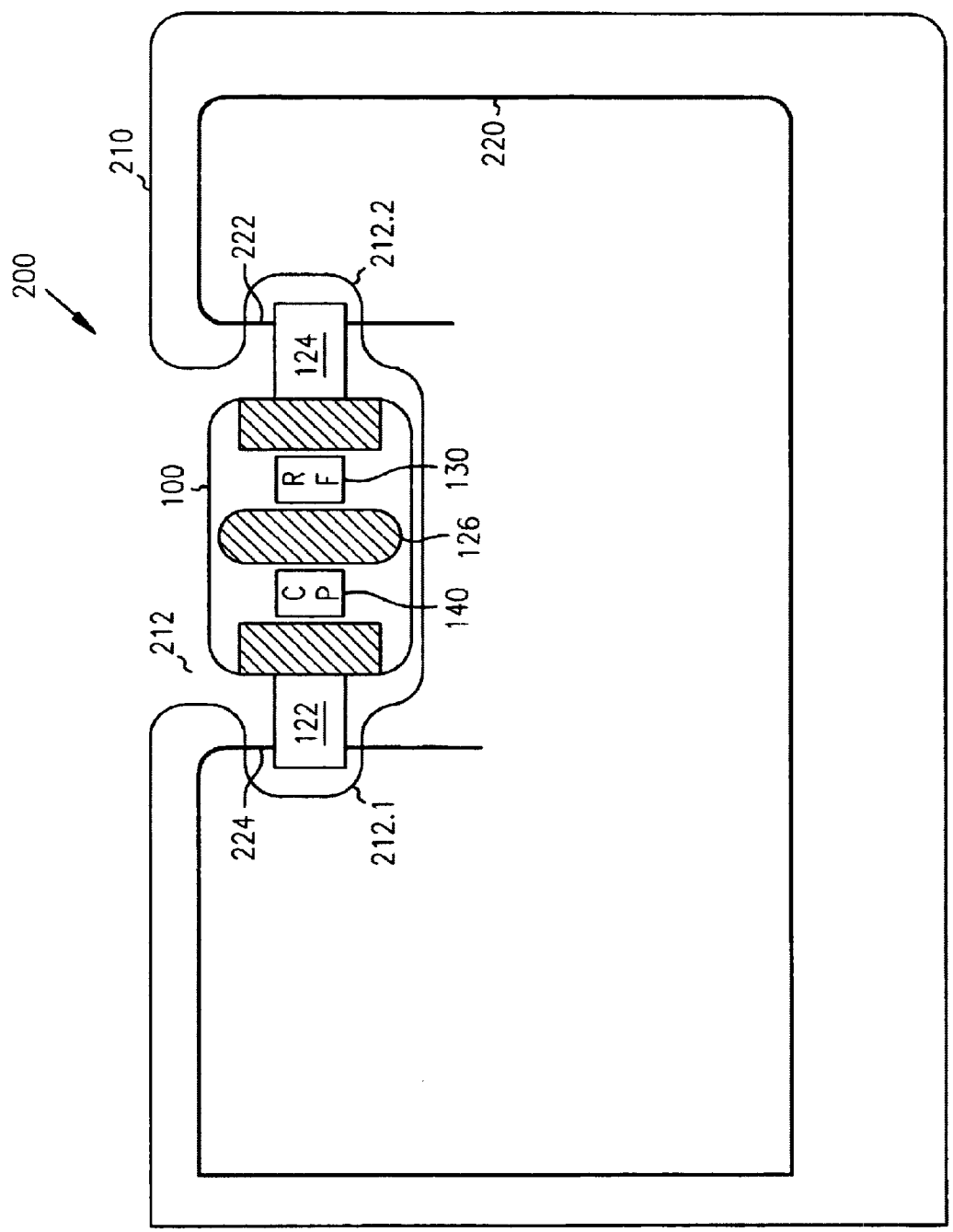
FIG. 2 is a conceptual view of an exemplary RFID device 200 incorporating RFID module 100 of FIG. 1.

More particularly, FIG. 2 shows an unlaminated RFID card (or tag) assembly 200 incorporating RFID module 100. In addition to module 100, assembly 200 includes a conventional card substrate 210 and an antenna coil 220. Card substrate 210 includes a cutout 212 which has opposing notches 212.1 and 212.2 that expose corresponding conductive portions 222 and 224 of antenna coil 220. Conductive portions 222 and 224 are coupled to extended portions 122.1 and 124.1 of extended contact structures 122 and 124 using conventional techniques.

Figure 3:
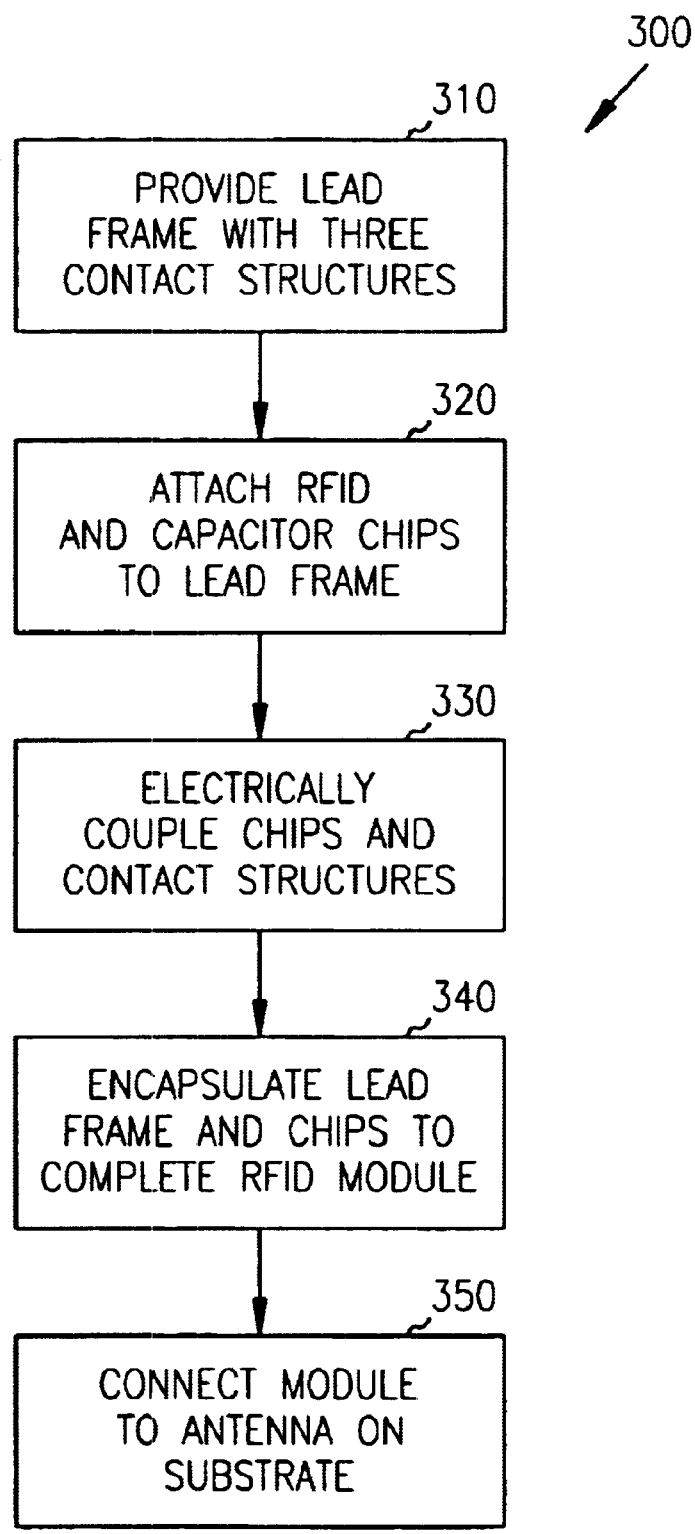
FIG. 3 is a flow chart illustrating an exemplary assembly method based on the RFID module 100 and RFID device 200.

FIG. 3 shows a flow chart 300 which illustrates an exemplary fabrication or assembly method based on module 100 and assembly 200 in FIGS. 1 and 2. The flow chart includes process blocks 310–350. The present invention is not limited to the order of the blocks in flow chart 300.

The exemplary method begins at block 310 with provision of a lead frame in accord with lead frame 120 in FIG. 1. Execution then proceeds to block 320, which entails attaching chips 130 and 140 to the lead frame. Block 330 entails completing the electrical connections of the chips to the three contact structures of the lead frame, and block 340 entails encapsulating the resultant lead frame and chip assembly in an insulative material to yield module 100 as shown in FIG. 1. The exemplary method concludes at block 350 with attachment or connection of two of the contact structures, for example, 122 and 124, of module 100 to an antenna coil on a card substrate, as shown in FIG. 2.

CONCLUSION

In furtherance of the art, the inventors have presented an exemplary RFID module which uses a three-terminal integrated circuit and two capacitors, but only requires two external leads or connections. One exemplary embodiment of the module includes two external terminals for connection to an antenna coil and an internal terminal for connection to a center-tap of a center-tapped capacitor. Other aspects of the invention include the structure of various components of the module and methods of tag assembly using the module.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A lead frame for use in making a radio-frequency-identification module, the lead frame including:
   first and second recessed regions for receiving first and second chips; and
   at least three contact pads, with at least two of the pads for connection to components external to the module.

2. A lead frame for use in making a radio-frequency-identification module, the lead frame including:
   a first conductive structure having a first body portion and a first extended portion, with the first extended portion for extension outside the module and connection to an antenna coil;
   a second conductive structure having a second body portion and a second extended portion, with the second extended portion for extension outside the module and connection to the antenna coil; and a third conductive structure completely separated from the first and second conductive structures and for connection to one or more contact pads inside the module.

3. The lead frame of claim 2, wherein the first conductive structure includes a recessed region for receiving an integrated-circuit chip.

4. The lead frame of claim 2, wherein the third conductive structure is between the first and second conductive structures.

5. A radio-frequency-identification module comprising:

first and second electrically connected chips, with one of the chips including an external terminal and at least two capacitors, with each of the capacitors coupled to the external terminal; and first and second external leads electrically coupled to the first and second chips, with the external leads for connection to an antenna coil.

6. The module of claim 5, further comprising:

an insulative housing enclosing the first and second electrically connected chips.

7. The module of claim 5, wherein the first chip comprises a wireless-communications circuit and a memory.

8. The module of claim 5, wherein the two capacitors define a center-tapped capacitor.

9. The module of claim 5, further comprising a lead frame including first and second recessed regions and at least three contact pads, with the first and second chips mounted respectively to the first and second recessed regions, and at least two of the pads for connection to the antenna coil and one of the pads coupled to the external terminal.

10. The module of claim 5, further comprising a lead frame, wherein the lead frame includes:

a first conductive structure having a first body portion mounted to the first chip and a first extended portion for extension outside the module and connection to the antenna coil;

a second conductive structure having a second body portion mounted to the second chip and a second extended portion for extension outside the module and connection to the antenna coil; and a third conductive structure completely separated from the first and second conductive structures and electrically coupled to the external terminal.

11. A radio-frequency-identification module comprising:

a lead frame having at least first, second, and third separate contact regions, with the first and second contact regions for connection to an antenna coil;

an RFID chip fixed relative to the first contact region;

a capacitor chip fixed relative to the second contact region and having at least first, second, and third terminals;

a first electrical connection between the first terminal and the first contact region;

a second electrical connection between the second terminal and the second contact region; and a third electrical connection between the third terminal and the third contact region.

12. The module of claim 11, wherein the RFID chip and the capacitor chip are attached respectively to the first and second contact regions.

13. The module of claim 11, wherein the capacitor chip includes a center-tapped capacitor.

14. An assembly comprising:

an antenna coil having first and second conductive portions; and the module of claim 11, wherein the first and second contact regions are coupled respectively to the first and second conductive portions.

* * * * *